(12) United States Patent
Allison et al.

(10) Patent No.: US 6,938,040 B2
(45) Date of Patent: Aug. 30, 2005

(54) PATTERN MATCHING IN COMMUNICATIONS NETWORK WHERE FIRST MEMORY STORES SET OF PATTERNS, AND SECOND MEMORY STORES MASK DATA IDENTIFYING PATTERNS IN THE FIRST MEMORY

(75) Inventors: Samuel Steven Allison, Fuquay-Varina, NC (US); Kenneth James Barker, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 833 days.

(21) Appl. No.: 09/067,599

(22) Filed: Apr. 28, 1998

(65) Prior Publication Data

US 2002/0077995 A1 Jun. 20, 2002

(51) Int. Cl.⁷ .............................................. G06F 17/30
(52) U.S. Cl. ................................... 707/10; 713/201
(58) Field of Search ............................... 713/150–167, 713/169–181, 189–193, 200–202, 601, 100, 300, 320, 310; 714/3, 4, 37, 43, 44; 711/156, 159, 167; 710/10, 36, 72, 128, 129; 709/225–237, 249–250, 300–302; 707/1–10, 100–104, 200–206; 370/510–512

(56) References Cited

U.S. PATENT DOCUMENTS

| | | | |
|---|---|---|---|
| 4,403,303 A | 9/1983 | Howes et al. .................. 703/27 |
| 5,311,509 A | 5/1994 | Heddes et al. ............... 370/397 |
| 5,381,414 A | 1/1995 | Gibson ........................ 370/311 |
| 5,396,636 A | 3/1995 | Gallagher et al. ........... 713/323 |
| 5,404,544 A | 4/1995 | Crayford ..................... 713/310 |
| 5,412,782 A | 5/1995 | Hausman et al. ........... 709/250 |
| 5,446,914 A | 8/1995 | Paul et al. ................... 709/235 |
| 5,485,584 A | 1/1996 | Hausman et al. ............. 710/22 |
| 5,526,355 A | 6/1996 | Yang et al. .................. 370/448 |
| 5,560,038 A | 9/1996 | Haddock ...................... 709/236 |
| 5,596,575 A | 1/1997 | Yang et al. .................. 370/468 |

(Continued)

FOREIGN PATENT DOCUMENTS

| | | | |
|---|---|---|---|
| EP | 0752637 | 1/1997 | ............. G06F/1/26 |
| EP | 0777172 | 6/1997 | ............. G06F/1/32 |
| WO | 9613106 | 5/1996 | ........... H04L/12/12 |
| WO | 9715123 | 4/1997 | |
| WO | 9733408 | 9/1997 | ........... H04L/12/40 |

OTHER PUBLICATIONS

IBM Technical Disclosure Bulletin, vol. 40, #10, Oct. 1997 "Gigabit Speed Multi–Protocol Chip and Adapters for Network Computing".
IBM Technical Disclosure Bulletin, vol. 38, #08, Aug. 1995 "Method of Flow Control for 100–Mbps Ethernet Adapters".
IBM Technical Disclosure Bulletin, vol. 37, #04A, Apr. 1994 "Interleaved Dual–Port VRAM for High–Speed Communication".
IBM Technical Disclosure Bulletin, vol. 38, #07, Jul. 1995 "Recovery Method for Damaged Firmware".
IBM Technical Disclosure Bulletin, vol. 37, #10, Oct. 1994 "Adapter Microcode Protection During Download".
IBM Technical Disclosure Bulletin, vol. 38, #12, Dec. 1996 "Definition of a Global Wake on Local Area Network Frame".

*Primary Examiner*—Srirama Channavajjala
(74) *Attorney, Agent, or Firm*—Joscelyn G. Cockburn

(57) ABSTRACT

Stations in a communications network are awakened by matching a pattern received from the communications network with patterns in the stations. When a match occurs, the stations are awakened. The patterns are arranged contiguously on word boundaries. A nibble (4 bits) in a mask word identifies the part of the pattern word to be used in the comparison.

19 Claims, 13 Drawing Sheets

U.S. PATENT DOCUMENTS

| | | | |
|---|---|---|---|
| 5,604,867 A | 2/1997 | Harwood | 709/233 |
| 5,642,360 A | 6/1997 | Trainin | 370/230 |
| 5,659,758 A | 8/1997 | Gentry et al. | 710/260 |
| 5,659,794 A | 8/1997 | Caldarale et al. | |
| 5,689,726 A | 11/1997 | Lin | 710/10 |
| 5,742,833 A * | 4/1998 | Dea et al. | 713/323 |
| 5,778,000 A * | 7/1998 | Dosiere et al. | 370/512 |
| 5,802,287 A * | 9/1998 | Rostoker et al. | 709/250 |
| 5,802,305 A * | 9/1998 | McKaughan et al. | 709/227 |
| 5,835,719 A * | 11/1998 | Gibson et al. | 709/221 |
| 5,892,768 A * | 4/1999 | Jeng | 370/445 |
| 5,938,771 A * | 8/1999 | Williams et al. | 713/310 |
| 6,012,100 A * | 1/2000 | Frailong et al. | 709/250 |
| 6,016,401 A * | 1/2000 | Rostoker et al. | 712/29 |

\* cited by examiner

| DA | SA | LENGTH/ TYPE | DATA | PADDING (IF NEEDED) | CRC |

DA - DESTINATION ADDRESS (6 BYTES)
SA - SOURCE ADDRESS (6 BYTES)
LENGTH/TYPE - LENGTH OF DATA FIELD (IEEE 802.3)/TYPE DEFINITION (ETHERNET)
    (2 BYTES)
DATA - LLC DATA (INCLUDING PADDING, IF NEEDED, IN SHORT LLC FRAMES)
    (46 TO 1500 BYTES)
CRC - CYCLE REDUNDANCY CHECK (4 BYTES)

ETHERNET FRAME FORMAT

FIG. 2

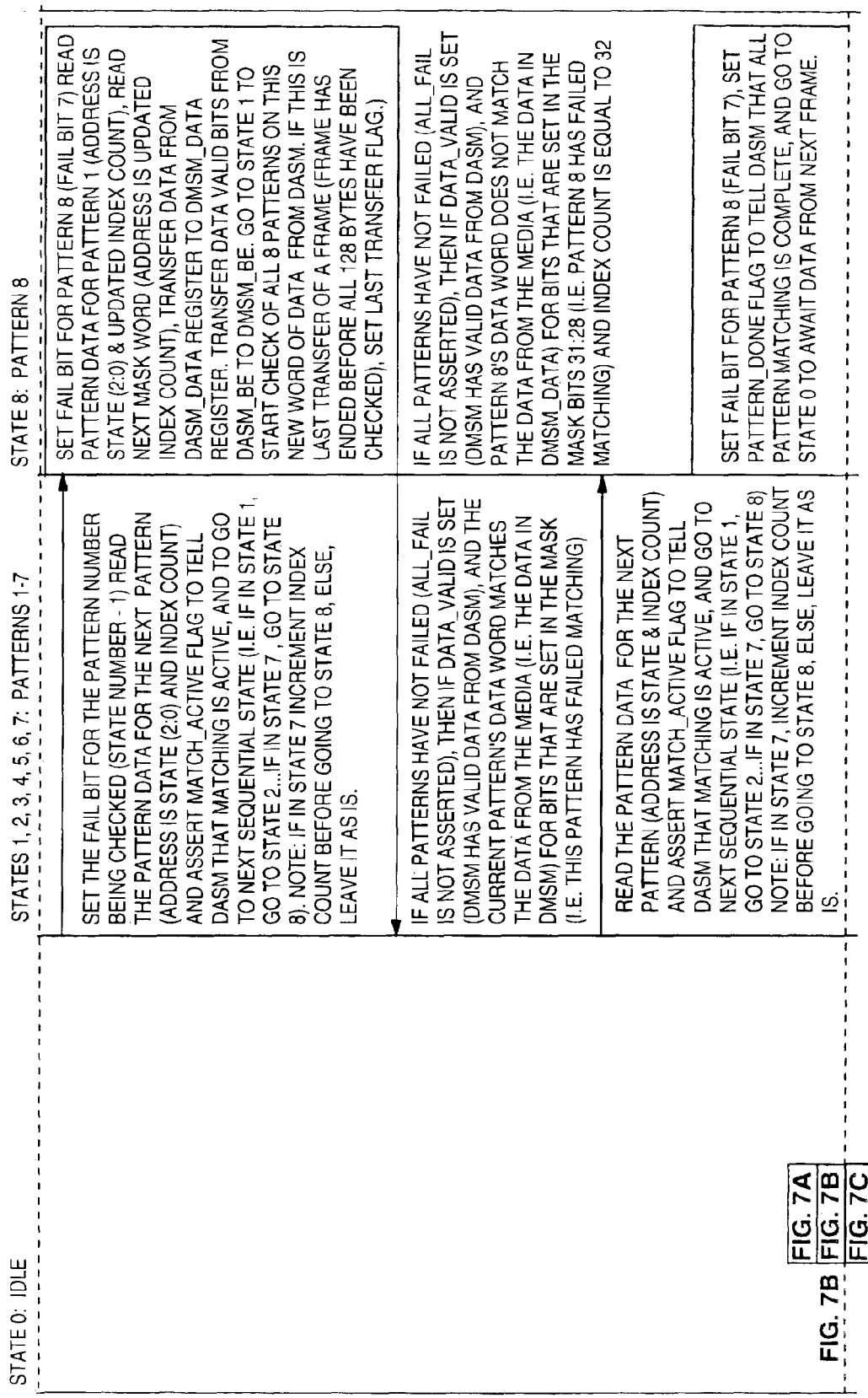

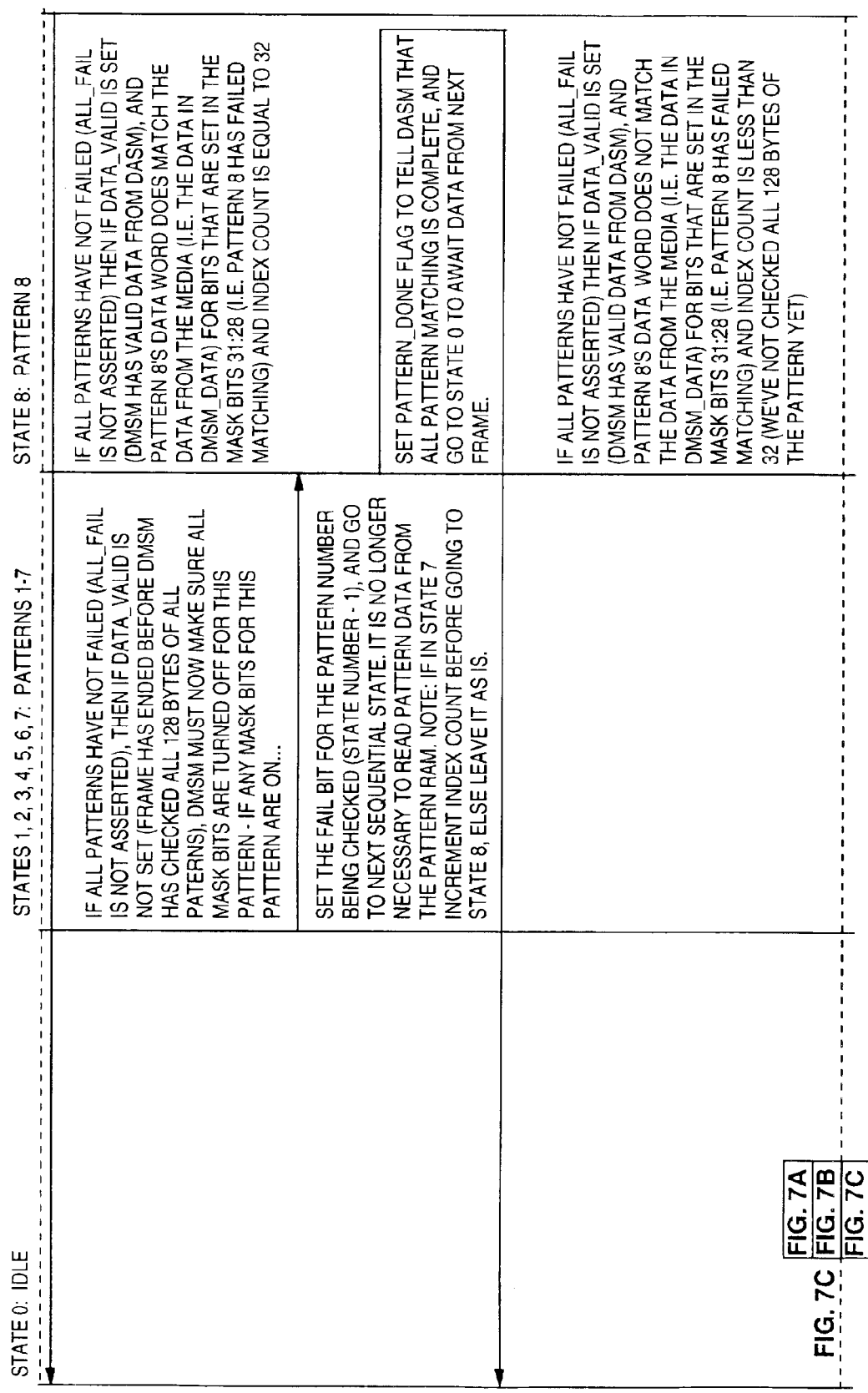

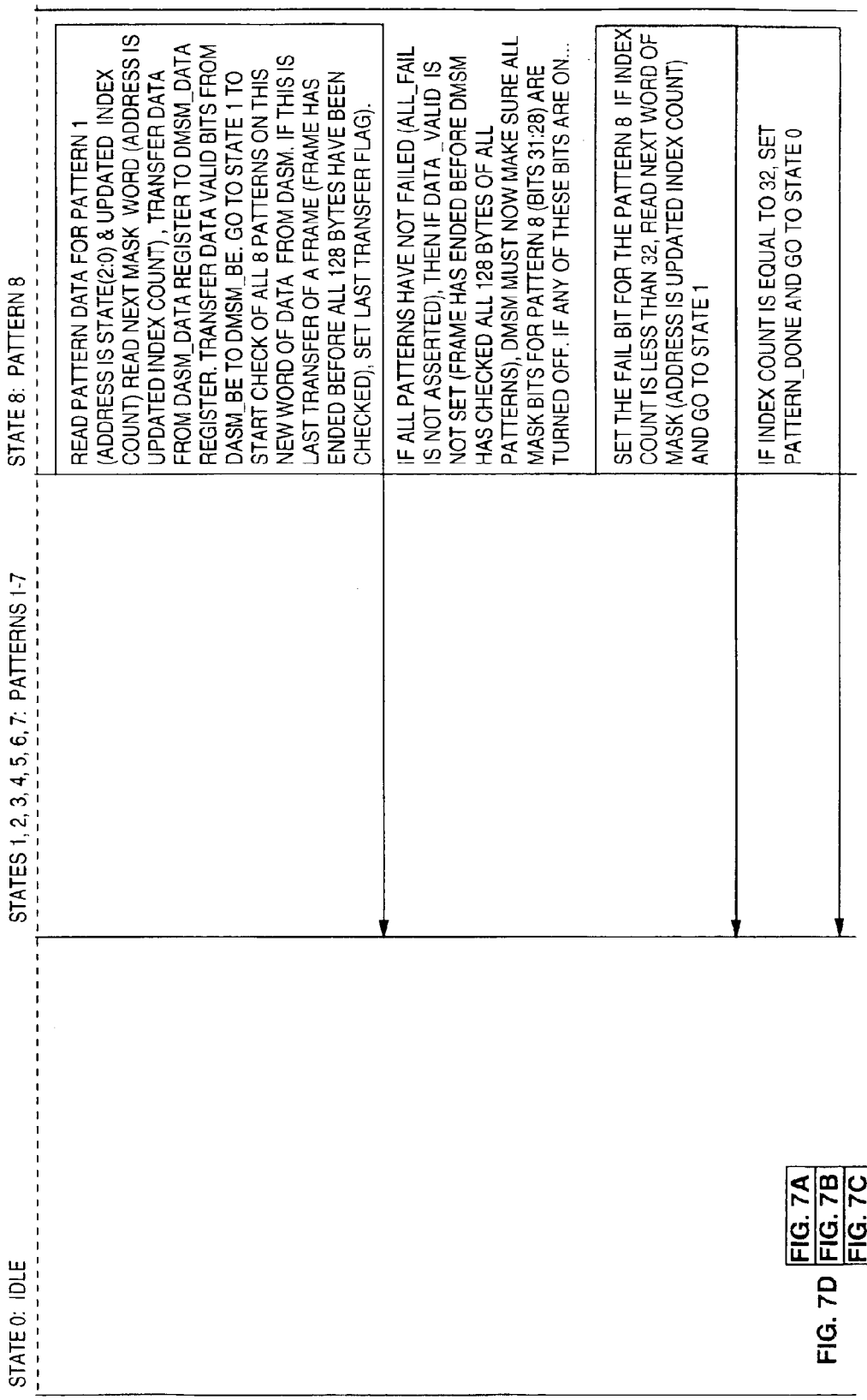

| PATTERN NUMBER | PATTERN RAM LOCATION (BYTE ADDRESS) | PATTERN RAM LOCATION (WORD ADDRESS) |
|---|---|---|
| 1 | 000-07F | 000-01F |
| 2 | 080-0FF | 020-03F |
| 3 | 100-17F | 040-05F |
| 4 | 180-1FF | 060-07F |
| 5 | 200-27F | 080-09F |
| 6 | 280-2FF | 0A0-0BF |
| 7 | 300-37F | 0C0-0DF |
| 8 | 380-3FF | 0E0-0FF |

FIG. 8

| bits | | | | | | | | | | | | | | | | |
|---|---|---|---|---|---|---|---|---|---|---|---|---|---|---|---|---|
| 31 | 28 | 27 | | 24 | 23 | | 20 | 19 | | 16 | 15 | | 12 | 11 | | 8 | 7 | | 4 | 3 | | 0 |
| MASK FOR PATTERN 8 WORD I | | MASK FOR PATTERN 7 WORD I | | MASK FOR PATTERN 6 WORD I | | MASK FOR PATTERN 5 WORD I | | MASK FOR PATTERN 4 WORD I | | MASK FOR PATTERN 3 WORD I | | MASK FOR PATTERN 2 WORD I | | MASK FOR PATTERN 1 WORD I |

FIG. 9

PATTERN MATCHING IN COMMUNICATIONS NETWORK WHERE FIRST MEMORY STORES SET OF PATTERNS, AND SECOND MEMORY STORES MASK DATA IDENTIFYING PATTERNS IN THE FIRST MEMORY

BACKGROUND OF THE INVENTION

1. Field of the Invention

The invention relates to pattern detection techniques in general, and in particular, to its application to communications technology.

2. Prior Art

Processing systems for monitoring a communications network, such as Local Area Networks (LAN), and awakening a processor upon receiving a predetermined command or pulse from the network is well known in the prior art. U.S. Pat. No. 5,404,544 is an example of such processing systems. In the patent, the link pulse described in the 802.3/ethernet standard is used by a link connecting module to manage electrical power consumed by the link connecting module and the device that the link connecting module connects to the link. The patent describes a specialized method for power management on LAN and appears not suitable for general usage.

U.S. Pat. No. 5,396,636 describes a power management method in which a data transmission link transmits Power On frame when power is to be restored to a particular host on the link. Prior to receiving the Power ON frame, the host is maintained in an off-power state with a small amount of power being provided to selected components in the module that connects the host to the link. Upon receiving the Power On frame, full power is restored to the host. This method is a specialized situation in which only one fixed command can be used to wake-up the host.

The general drawback with the above patents is that a specialized wake-up frame must be transmitted from the "waker" to the "wakee".

The Device Class Power Management Reference Specification, jointly authored by Microsoft® and Advanced Micro Devices®, Inc. refer to a more general approach in which patterns and byte masks are used to effectuate wake-up of a station. However, the specification does not provide an implementation.

SUMMARY OF THE INVENTION

It is an object of the present invention to provide a mechanism that uses pattern matching to provide the wake-up function to devices in a communications network.

The mechanism includes a pattern match RAM, a mask RAM and pattern match logic. The patterns against which information from the network is to be matched are loaded in the Pattern RAM. The masks which identify the portion of a word in the Pattern RAM against which information from the network is compared is loaded in the Mask RAM. The pattern match logic based upon the setting (state) of bits in the Mask RAM select patterns in the Pattern RAM and correlates the selected patterns with data from the network and generates a control signal if a match is determined. The control signal is used to awaken a host, such as a personal computer (PC), from a low-power state or off-state.

In one feature of the invention, the control signal is only generated if the frame on which the match is occurring is addressed to the station detecting the match. The foregoing object and feature of the present invention should be more readily apparent after review of the following more detailed description of the present invention.

BRIEF DESCRIPTION OF THE DRAWINGS

FIG. 2 shows the frame format for information on the network.

FIGS. 7A through 7D show the state machine diagram for the Data Match State Machine (DMSM).

FIG. 8 shows a graphical representation of patterns in the Pattern RAM.

FIG. 9 shows a graphical representation of mask data in the Mask RAM.

DETAILED DESCRIPTION OF THE INVENTION

The present invention can be used in any environment or technology in which pattern matching is required. It works well in matching patterns to facilitate power management in communications networks, such as Local Area Network (LAN) and will be described in this environment. However, this should not be construed as a limitation on the scope of the present invention since it is well within the skill of one skilled in the art to use the invention disclosed and claimed and expand it to the other technologies. Any such usage is intended to be covered by the teachings and claims of this patent.

Figure 1:
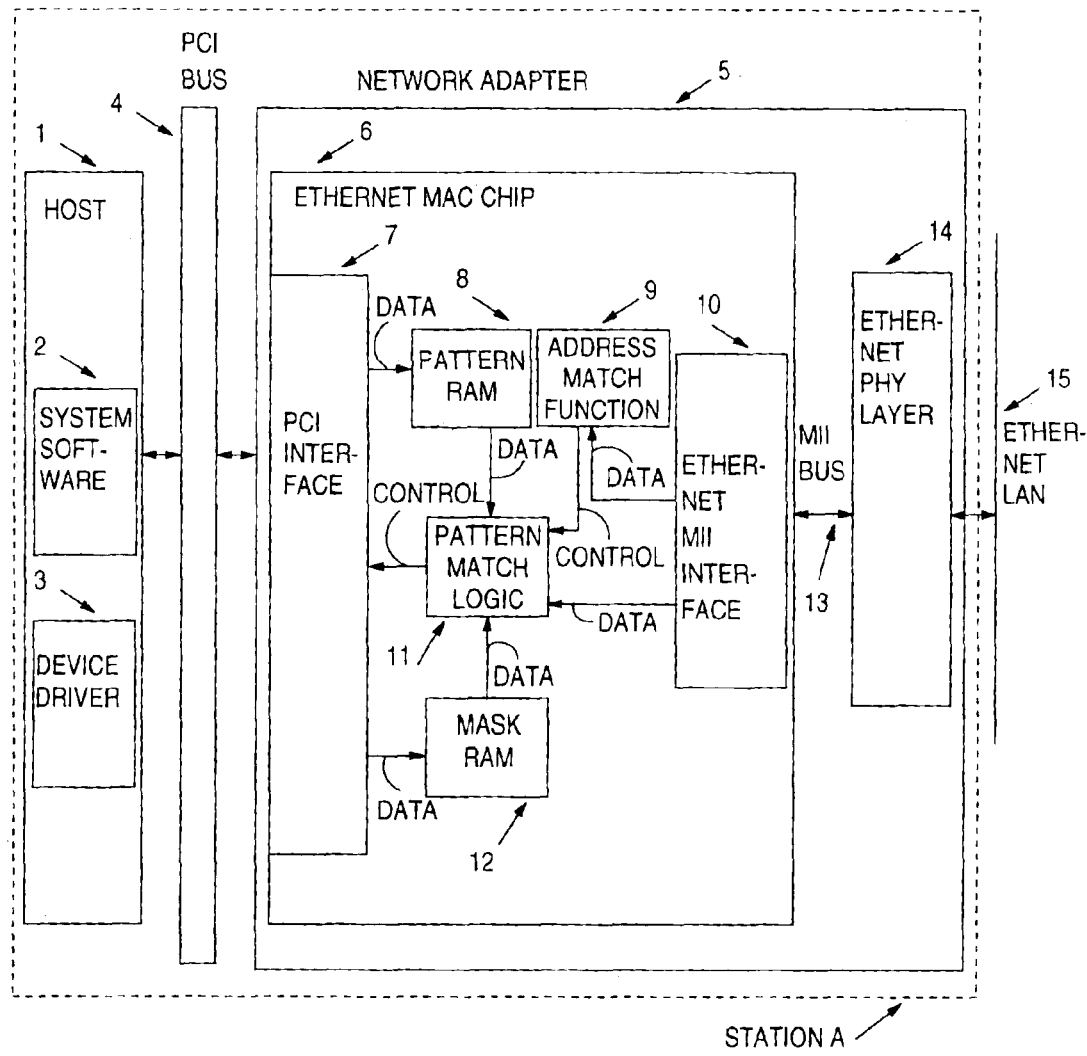
FIG. 1 shows a communications network incorporating the teachings of the present invention.

FIG. 1 shows a communications network in which the present invention to be described hereinafter is implemented. The communications network includes Ethernet LAN 15 and a plurality of stations (only one of which is shown and identified as station A) connected to the ethernet LAN. The station A includes a host computer 1 with a device driver 3, system software 2 and PCI Bus 4. A Network Adapter 5 couples the PCI Bus to the ethernet LAN. The Network Adapter includes ethernet MAC chip 6, MII bus 13, and ethernet Physical (PHY) layer chip 14. The MII bus is a standard interface that is used to connect an Ethernet MAC to an Ethernet PHY chip. MII is an IEEE standard interface that allows any Ethernet MAC to connect to any Ethernet PHY, making the MAC independent of the type of media connected to the PHY.

Similarly, the ethernet physical layer chip 14 is a standard chip that has the specialized analog and digital circuits necessary to interface with the type of media the network is made of. The media could include fiber, unshielded twisted pair (UTP), or shielded twisted pair (STP), etc.

The ethernet MAC (Medium Access Controller) chip 6 includes the PCI interface 7, Pattern RAM 8, Mask RAM 12, pattern match logic 11, address match function 9, and ethernet MII interface 10. The named circuits are interconnected by data and control lines as shown in the figure. In addition, the chip includes circuit arrangement that provides standard ethernet functions.

Still referring to FIG. 1, the PCI interface 7 exchanges information between the PCI bus and the ethernet MAC chip. Included in the information are pattern data and mask data which is outputted on the respective data bus to the Pattern RAM and the Mask RAM. The Pattern RAM stores the pattern which is to be compared with information taken from the ethernet LAN. Likewise, the Mask RAM 12 stores bit pattern which identify the bytes in the Pattern RAM to be compared with data received from the ethernet LAN. The address match function 9 compares the destination address in the received frame with its own address multicast address of interest and the broadcast addresses and, if a match is found, a control signal is generated and outputted on the control line to the pattern match logic. The pattern match logic receives data from the ethernet MII interface 10 correlates with data from the Pattern RAM and the Mask RAM, and when a match is found and the address match function outputs the proper control signal, a signal is generated by the pattern match logic which is forwarded, on the control line, to the PCI interface, informing it that the host computer should be awakened from its sleep (off-state) or low-power state.

Details of the respective blocks will be given hereinafter. Suffice it to say, at this time, the system software 2 running in the host computer decides to put the computer into a low power state referred hereinafter as sleep state. Part of the procedure for putting the host computer in the sleep state is to give the device driver 3 a list of data patterns that it would like the network adapter 5 to recognize if received and then wake up the host computer. The device driver 3 knows the length and number of patterns that the network adapter will support. In a preferred embodiment of this invention and for purposes of discussion, the length of each pattern in the Pattern RAM is chosen to be 128 bytes and the number of patterns in the Pattern RAM is eight. The device driver 3 will then write the pattern data into the Pattern RAM 8 and the mask bits into Mask RAM 12 and enable the pattern match logic 11. At this time, the network adapter 5 is no longer transmitting frames and is only receiving frames from the media and checking for data sequences that match the data coming in from the network. When a match is determined, the pattern match logic informs the PCI interface 7 from which a proper command waking up the host computer is issued.

FIG. 2 shows a schematic representation of the ethernet frame which is transported on the ethernet LAN. The ethernet frame includes the following:

DA—Destination Address (6 bytes)

SA—Source Address (6 bytes)

Length/Type—Length of Data field (IEEE 802.3)/Type definition (Ethernet) (2 bytes)

Data—LLC Data (including padding, if needed, in short LLC frames) 46 to 1500 bytes)

CRC—Cycle Redundancy Check (4 bytes)

Even though the wake up pattern can be of any length and positioned anywhere in the frame, for practical purposes, it is believed that the length is typically 64–128 bytes and is positioned within the first 128 bytes of the ethernet frame. Accordingly, in the preferred embodiment of this invention, if the pattern is presented in the first 128 bytes of the frame, the present invention will recognize it. Of course, the technique may be extended to cover pattern position subsequent to the first 128 bytes of the ethernet frame. To do this involves having the data pattern and the byte mask of bits to tell the pattern match logic which bytes in the pattern to compare with information from the network. Frames received when the station is in network wake up mode are discarded. In addition, while in network wake up mode, no frames will be transmitted. Once a pattern match is made, the pattern match logic will remain in the network wake up mode until the device driver disables it. Also, the frame must successfully pass address match logic (i.e., a copy valid frame) in order to be a wake up match.

FIG. 8 shows a table for arranging data pattern in the Pattern RAM 8. Viewing the table from left to right column one identifies the pattern number and shows that for this embodiment, eight patterns (1–8) will be loaded in the Pattern RAM from the device driver. Column two shows the Pattern RAM location (byte address) whereat the patterns reside. These are the addresses used to access a byte in the RAM. Finally, column three shows the word address for the words in the Pattern RAM location. The word address extends from H000 through 0FF. The patterns are arranged contiguously within the RAM. This arrangement is also true for the words within a pattern. As used in this application, a word includes 32 (0–31) data bits.

FIG. 9 shows a graphical representation of how the mask bits are arranged in Mask RAM 12 (FIG. 1). As can be seen in FIG. 9, it is arranged such that each 32 bit word of mask data contains the mask bits for all eight patterns for each 32 bit word of data in the Pattern RAM or 32 bit word of data received from the ethernet network. Consequently, bits 0 through 3 of the mask data are the mask bit for pattern 1 word i (i being the number of the word under consideration), bits 4 through 7 are mask bits for pattern 2, bits 8 through 11 are mask bits for pattern 3, and so forth.

In the preferred embodiment, there are eight pattern words. Therefore, i can take the values 1, 2, 3, 4, 5 . . . 8. Consequently, if i=1, bits 0–3 are mask bits for pattern 1, word 1; bits 4–7 are mask bits for pattern 2, word 1; bits 8–11 are mask bits for pattern 3, word 1 and so forth. Each group of four bits (Mask Group) in the Mask RAM relates to the four bytes of a word in the Pattern RAM. As a consequence, the first bit of a Mask Group relates to the first byte of the associated pattern word, the second bit of the Mask Group relates to the second byte of the associated pattern word, the third bit of the Mask Group relates to the third word of the associated pattern word and the fourth bit of the Mask Group relates to the fourth word of the associated pattern word. It should be noted that the relationship between the bits in a Mask Group and the related word in the associated pattern may be changed without deviating from the spirit and scope of the present invention. The setting (state) of the bit in the Mask Group determines whether or not a word in the associated pattern is to be compared with a word off the network. If the bit is set to 1, the related word in the Pattern RAM is compared with the word from the network. If the bit is set to 0, no comparison is done.

All mask bits are contained from address 0 to address 127 in the Mask RAM 12 (FIG. 1). It was done this way so the Data Match State Machine (DMSM), to be described hereinafter, only has to do one read of the Mask RAM 12 for each 32 bit of data supplied by the Data Accumulator State Machine (DASM), to be discussed hereinafter. The DMSM still has to do eight reads of pattern data from the Pattern RAM 8, one for each pattern compared. By arranging the data as discussed above in the Mask RAM and the Pattern RAM, accessing and comparing is much easier than would otherwise be. The technique for generating address for reading both the Pattern RAM and the Mask RAM will be described hereinafter.

Figure 3:
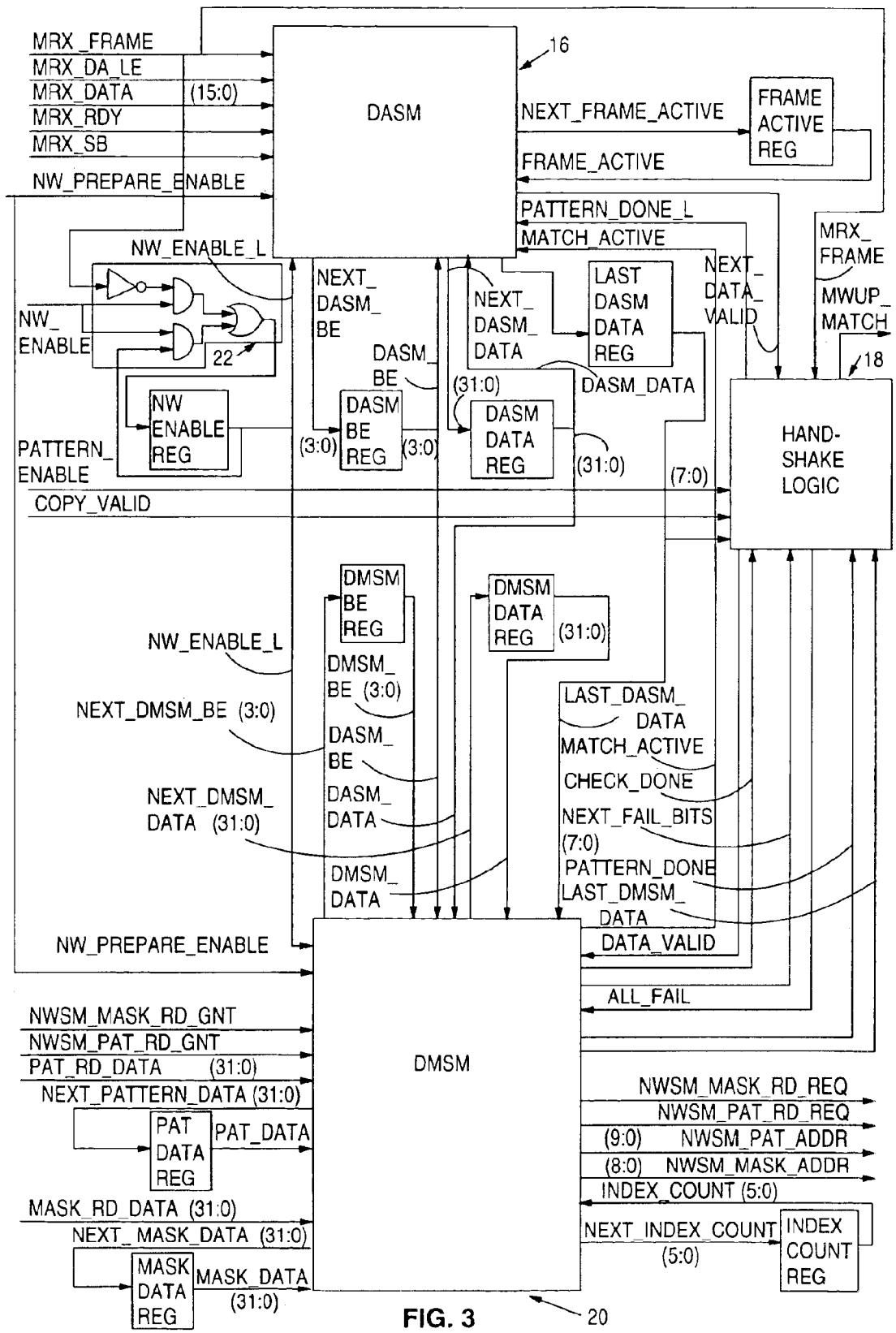
FIG. 3 shows a block diagram for the pattern match logic.

FIG. 3 shows a block diagram for the pattern match logic. The pattern match logic includes Data Accumulation State Machine (DASM) 16, Data Match State Machine (DMSM)

20, Handshake Logic 18, a plurality of Data Registers, logic circuit arrangement 22, a plurality of control lines entering the named components, and a plurality of control lines outputted from these components. The named components are operably interconnected as shown in the figure. The primary function of the components set forth in FIG. 3 is to compare selected information from the network with identified bytes in the Pattern RAM and output a control signal called NWUP Match from Handshake Logic 18 when a match occurs between a byte from the network and a byte in the Pattern RAM. The signal NWUP-MATCH is forwarded to the PCI Interface 7 (FIG. 1) and indicates receipt of a Network Wake Up FRAME. This signal is used to assert PME # (Power Management Event, i.e. wake up the system) in the PCI Interface. It should be noted that the PME # is a specific command in the PCI Interface Command Set and further details of that signal will not be given here. Suffice it to say, when that command is activated, the waking up of the host computer is initiated.

Still referring to FIG. 3, the DASM 16 interfaces with the ethernet MII Interface logic to delineate the frames and to accumulate 32 bit words of data from the 16 bit words passed from the Ethernet MII interface. The Data Match State Machine, hereafter DMSM 20, takes the 32 bit word from the DASM 16, handles reading the data patterns and masks and does the comparison. The handshake logic 18 uses control signals from the DMSM, the DASM and external signal to generate the NWUP-MATCH signal discussed above. As can be seen from FIG. 3, the two state machines have several signals that they use to communicate with each other. First, the data received from the media is provided on the line labeled MRX_Frame and is transferred from the DASM_DATA_REG to the DMSM_DATA_REG as are the byte enables (DASM_BE to DMSM_BE) to tell the DMSM which bytes of the data are valid. The data_valid signal is used by the DASM to tell the DMSM when it has valid data. This is used by the DMSM in the case that the frame ends before the 128 byte compare is complete. In that case, the DMSM must check the rest of the byte masks to make sure none of the remaining bytes in the 128 byte pattern should be compared. If any of the remaining byte masks are on, and the pattern has not previously failed, a mismatch occurs. The DMSM tells the DASM that it is still doing a match via the match active signal on the line or conductor labeled MATCH Active. This signal is used by the DASM to tell if the next arriving frame should be examined. If the next frame comes in while match active is on, that tells the DASM that DMSM is checking byte masks from the previous frame, so ignore it. This causes DASM to not accumulate data from the new frame, and no pattern matching will be done until that frame ends, and another frame is received.

Still referring to FIG. 3, the combinatorial logic 22 fed by the NW_ENABLE signal inhibits enabling of the state machines in the middle of a frame. The circuitry gate off setting of the NW_ENABLE_REG, if MRX_FRAME is high. Once MRX_FRAME is low, or once the NW_ENABLE register gets set, then it will continuously latch the value of the NW_ENABLE line. Table 1 sets forth the I/O signals shown in FIG. 3. Column 1 labelled, Signal, lists the name of relevant signals in FIG. 3. Column 2 of the table, labelled I/O, indicates if the signal is an input signal, labelled I, or if it is an output signal, it is labelled O. Finally, column 3, labelled Function, identifies the function which each signal performs. This table is helpful in understanding the name and function of each of the signals used in FIG. 3.

TABLE 1

Network WakeUp State Machines I/O Table

| Signal | I/O | Function |
| --- | --- | --- |
| MRX_FRAME | I | From Ethernet Mll Interface: Input that indicates an active receive frame. |
| MRX_DA_LE | I | From Ethernet Mll Interface: Input that indicates when the destination address of the receive data is being passed from Ethernet Mll Interface. |
| MRX_DATA | I | From Ethernet Mll Interface: 16 bit data bus from Ethernet Mll Interface containing receive data. |
| MRX_RDY | I | From Ethernet Mll Interface: Signal to indicate when valid data is on the MRX DATA bus. |
| MRX_SB | I | From Ethernet Mll Interface: Signal to indicate if only one byte (bits 16:8) on MRX_DATA is valid. Is only asserted on last transfer of a frame (if the frame length is an odd number of bytes). |
| NWSM_MASK_RD_GNT | I | From Mask Ram Arbitrator: Grant for a read request to the Mask RAM for reading Mask data. |
| NW_PREPARE_ENABLE | I | From PCI Interface: Signal from a Mode Register bit that resets Network Wakeup State Machines. |
| NW_ENABLE | I | From PCI Interface: Signal from a Mode Register bit that enables Network WakeUp State Machines for operation. |
| MASK_RD_DATA | I | From Mask RAM: 32 bit data bus containing Mask data read from Mask RAM. |
| NWSM_PAT_RD_GNT | I | From Pattern RAM Arbitrator: Grant for a read request to the Pattern RAM for reading Pattern data. |
| PAT_RD_DATA | I | From Pattern RAM: 32 bit data bus containing Pattern data read from Pattern RAM. |
| COPY_VALID | I | From Address Match Logic (AMF): Signal from AMF logic to indicate a frame has had an address match. Only frames that have an address match can also have a Network WakeUp match. |
| PATTERN_ENABLE | I | From PCI Interface: 8 bit bus indicating which patterns are enabled for matching. |
| NWSM_MASK_RD_REQ | O | To Mask Ram Arbitrator: Request to read Mask data from the Mask RAM. |
| NWUP_MATCH | O | To PCI Interface: Signal pulse to indicate receipt of a Network WakeUp frame. This signal is used to assert PME#(Power Management Event, i.e. wake up the system) in the PCI Interface. |

TABLE 1-continued

Network WakeUp State Machines I/O Table

| Signal | I/O | Function |
|---|---|---|
| NWSM_MASK_ADDR | O | To Mask Ram Arbitrator: Address of Mask data to be read from the Mask RAM. |
| NWSM_PAT_ADDR | O | To Pattern RAM Arbitrator: Address of Pattern data to be read from the Pattern RAM. |
| NWSM_PAT_RD_REQ | O | To Pattern RAM Arbitrator: Request to read Pattern data from Pattern RAM. |

Table 2, below, is the Register table identifying the registers in FIG. 3. Column 1 identifies the register, column 2 identifies the Reset Value for each of the registers and column 3, labelled Function, indicates the function provided by each of the registers. The table is self-explanatory and further discussion will not be given.

It is self-explanatory, therefore, only a few of the entries will be discussed. For example, under State 0, the first statement describes DASM checking to see if pattern matching is currently disabled (enable is turned off), or is about to become enabled (prepare for enable is set). If this condition is matched, the resulting action is to turn off DATA_VALID

TABLE 2

Register Table

| Register | Reset Value | Function |
|---|---|---|
| FRAME ACTIVE REG | 0 | Used by DASM to keep track of when a Frame is actively being processed. |
| DASM BE REG | 0 | 4 - bit register used to accumulate the byte enables by DASM |
| DMSM BE REG | 0 | 4 - bit register that is copied from DASM BE REG when data has been accumulated by DASM and is being processed by DMSM |
| DASM DATA PEG | 0 | 32 - bit register used to accumulate data by DASM |
| DMSM DATA REG | 0 | 32 - bit register used to hold data from DASM DATA REG once it is ready to process by DMSM |
| PAT DATA REG | 0 | 32 - bit register used to hold pattern data read from Pattern RAM |
| MASK DATA REG | 0 | 32- bit register used to hold Mask data read from Mask RAM. |
| INDEX COUNT REG | 0 | 6 - bit register used to index through each of the 32 words of a pattern. Gets reset once pattern match processing completes, either successfully or unsuccessfully. |
| FAIL BITS REG | 0 | 8 - bit register used to keep track of what patterns have failed to match. Gets reset once pattern match processing completes, either successfully or unsuccessfully. |
| DATA VALID REG | 0 | Used by DASM to indicate that valid data is ready in the DASM DATA REG. It gets reset once the frame has ended and DMSM has completed processing the word of data in that is in the DASM DATA REG. |
| NW_ENABLE REG | 0 | Used to latch up the NW_ENABLE signal from the PCI Slave. It will only be set to one if MRX_FRAME is off. It can be set to zero at any time. |
| COPY VALID REG | 0 | Used to latch up the Copy Valid signal from the AMF. It must be preserved until match processing completes. It also cannot be corrupted by a new frame coming in if match processing is still active, It gets reset once No more data is valid from DASM and no match activity is going on. |
| PATTERN_DONE_REG | 0 | Set by DMSM to indicate when pattern matching is complete. |
| LAST_DASM_DATA_REG | 0 | Set by DASM to tell DMSM when the last data transfer of the frame is occurring. |

Still referring to FIG. 3, DASM 16 has two states; namely:

0: Idle/Data 31:16: In this state, DASM detects the start of frame and end of frame. It also accumulates the upper 16 bits of the data coming from Ethernet MII Interface.

1: Data 15:0: In this state, DASM detects end of frame, and captures the lower 16 bits of the data coming from the Ethernet MII Interface. Four-byte enable bits are also passed from DASM 16 to DMSM 20 to reflect which of the 4 bytes are valid. The bits are only relevant on the last data transfer of the frame between DASM 16 and DMSM 20 because this is the only data transfer which will not necessarily be whole 4 bytes.

Figure 6A:
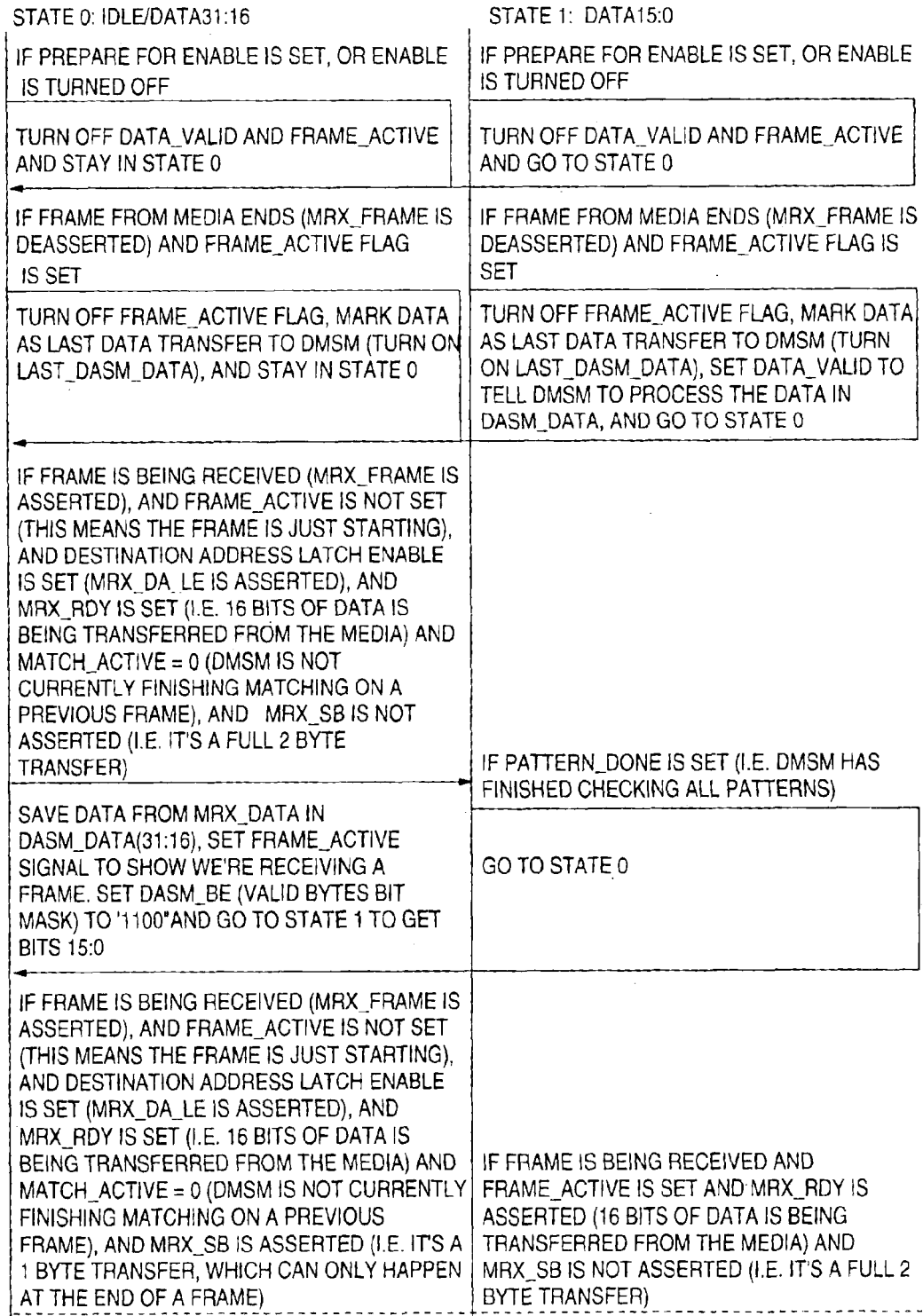
FIGS. 6A and 6B show the state machine diagram for the Data Accumulation State Machine (DASM).
Figures 6A, 6B:
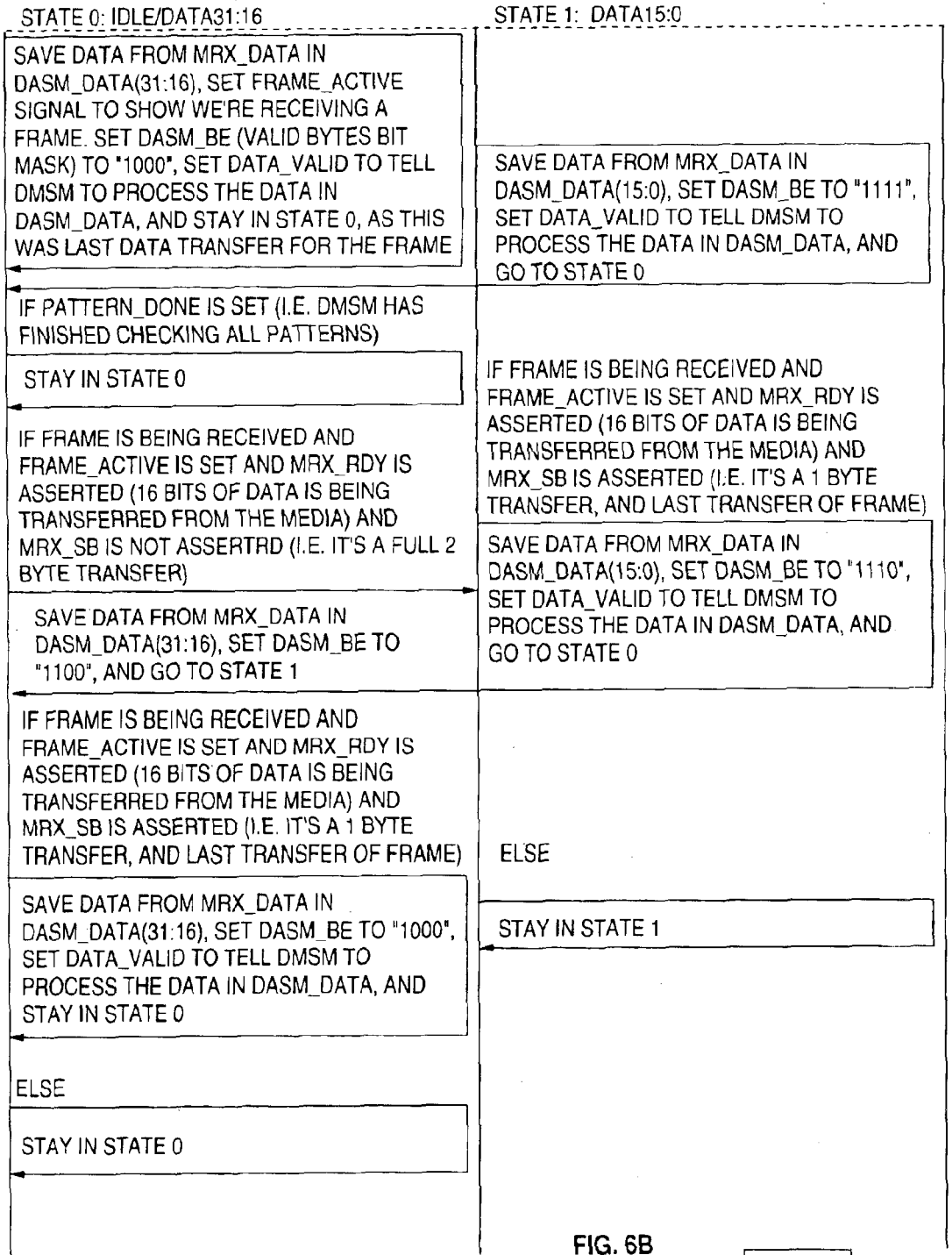

Turning to FIG. 6A for the moment, the DASM diagram is shown. The diagram can be used for designing the DASM.

and FRAME_ACTIVE and stay in state 0. In another example, in the next check in State 0, if the frame is not currently active (MRX_FRAME is deasserted), and the FRAME_ACTIVE flag is set, the frame has just ended. The resulting action is to turn off the FRAME_ACTIVE flag, mark the current data transfer to DMSM as the last transfer, and stay in state 0.

Referring to FIG. 7, the DMSM 20 has nine (9) states; namely:

0—Idle: Not active, waiting for DATA_VALID from DASM.

1—Match Pattern 1: Match data with Pattern 1 data and Mask.

2—Match Pattern 2: Match data with Pattern 2 data and Mask.

3—Match Pattern 3: Match data with Pattern 3 data and Mask.

4—Match Pattern 4: Match data with Pattern 4 data and Mask.

5—Match Pattern 5: Match data with Pattern 5 data and Mask.

6—Match Pattern 6: Match data with Pattern 6 data and Mask.

7—Match Pattern 7: Match data with Pattern 7 data and Mask.

8—Match Pattern 8: Match data with Pattern 8 data and Mask. State 8 must also determine when the entire pattern has been checked.

The data comparisons are done by comparing the data from DASM with Pattern Data from the Pattern RAM on a byte-by-byte basis, if the Byte Enable for that byte is a logical 1 and if the Mask bit for that byte is a logical 1. If the compare succeeds, and the byte Mask flag is set, the match is successful for that byte. If the Mask flag is off, the result of the compare is irrelevant. If the byte Mask flag is set, the Byte Enable must be set, and the data must compare, or a mismatch occurs and that pattern is marked as failed via a fail bit. This fail bit is generated by logic external to the DMSM. This logic does as the previous sentences describe: Following is the same information in a list of steps the logic does:

1. If DMSM_BE is set, i.e., the byte of data in the DMSM_DATA is valid, compare that byte with the corresponding byte of Pattern Data.
2. If the compare fails, check to see if the relevant MASK bit is on—if the MASK bit is on, the comparison has failed, otherwise, it passes. This logic passes a 4 bit value to DMSM one bit per byte being compared. If any of these four bits are set, the comparison has failed, and DMSM will set the FAIL BIT for that pattern.

If all patterns have failed; that is all Fail Bits are set, a signal called ALL_FAIL is set, and the state machine stops processing. If the frame ends before the pattern match is done, then DATA_VALID will turn off. This tells DMSM that there is no more data to check. However, it must continue and check the rest of the byte Masks for the 8 patterns to make sure that they all set to 0 for the remainder of the 128 bytes. Regardless of the frame state, if all 8 pattern fail, DMSM will stop and wait for the next invocation of DATA_VALID (that is, for the next new frame to arrive). In other words, if all 8 pattern have failed, DMSM does not bother doing any more checking for the life of the frame.

Figure 7A:
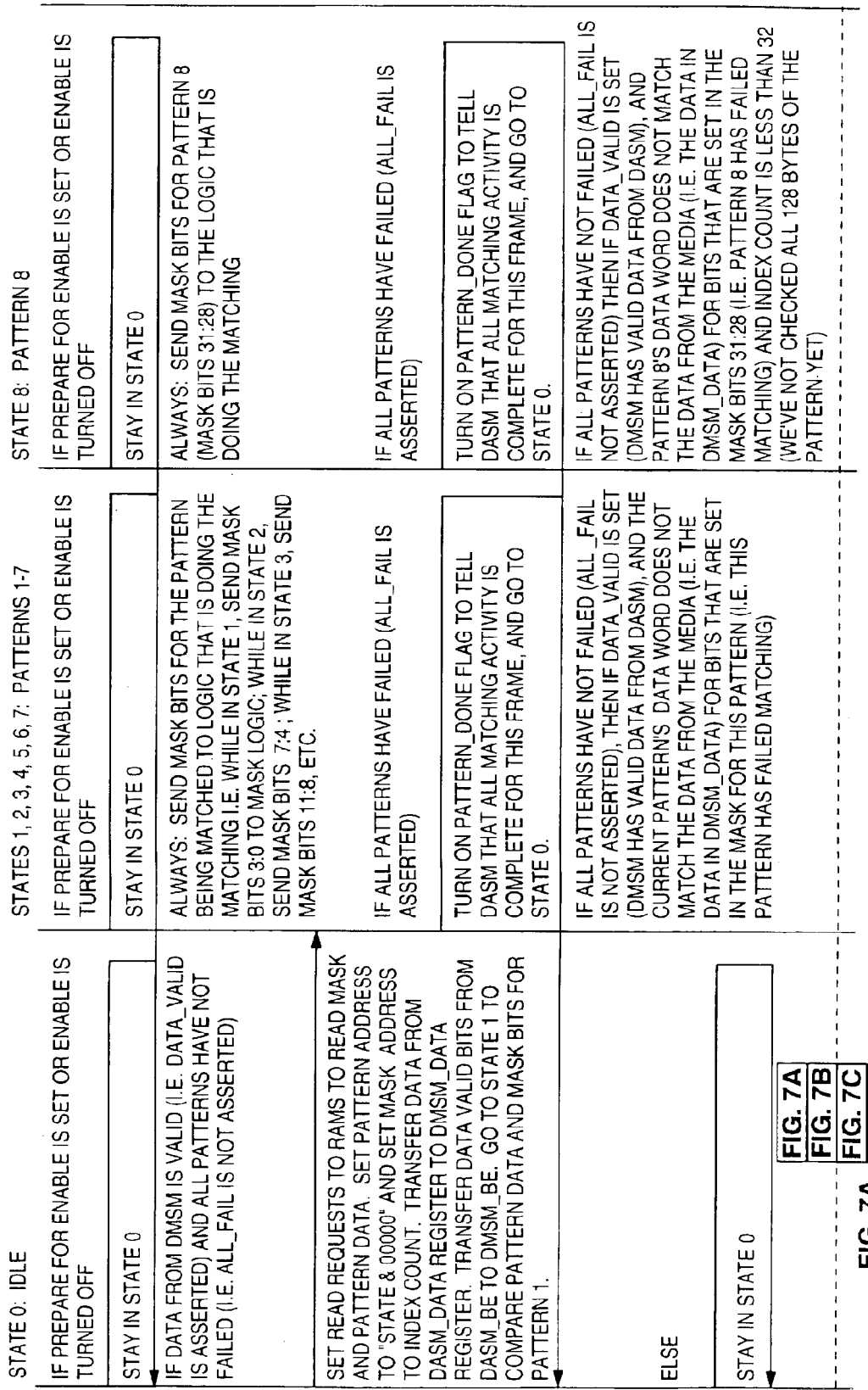

FIG. 7A shows a state machine diagram for the DMSM 20 discussed above. This state machine diagram can be used to design the logic required to provide the functions required by the DMSM 20. The DMSM diagram is self-explanatory, therefore only a few entries will be discussed. Under State 0, the first statement describes DMSM checking to see if pattern matching is currently disabled (enable is turned off), or is about to become enabled (prepare for enable is set). If this condition is matched, the resulting action is to stay in state 0 and do nothing. In another example, in the next check in State 0, DMSM checks to see if it has been given valid data by DASM (DATA_VALID is asserted) and all eight (8) patterns have not already failed their compares (ALL_FAIL is not asserted). If these conditions are met, DMSM will proceed to State 1, and will issue requests to the Pattern and Mask RAMs to read the first word from pattern 1 from the Pattern RAM, and the masks for word 1 for all eight (8) patterns from the Mask RAM. It also will transfer the data and byte enables from DASM into the DMSM data and byte enable registers.

Figure 4:
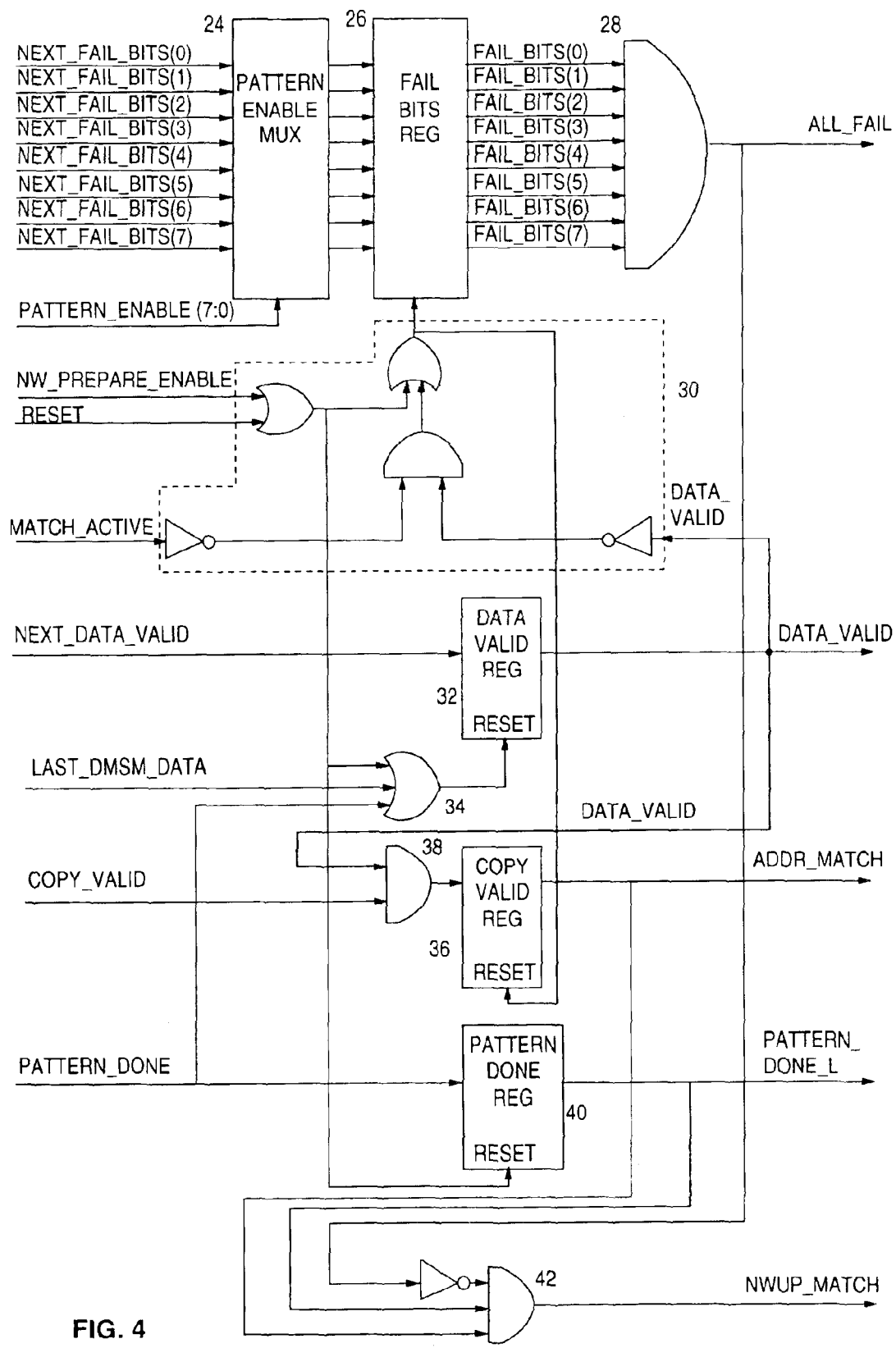
FIG. 4 shows details of the handshake logic.

FIG. 4 shows a circuit diagram for the handshake logic in FIG. 3. The handshake logic includes a pattern enable MUX 24 having inputs connected to individual bit lines and a data bus labelled Pattern Enable. The output from the Pattern Enable MUX is fed into the Fail Bits Register 26. The Fail Bits Register 26 is an 8 stage register with settings of each stage representing the status of a pattern in the pattern register. The output from each stage is fed into AND Gate 28 which generates the signal on line labelled ALL FAIL. The pattern enable MUX is used to override the failed bits. If a pattern is not enabled, it will cause the failed bit to be set. Pattern enable is set by the system to tell the DMSM if the pattern should be checked (i.e., the device driver has placed valid pattern data and mask for that pattern in the pattern and Mask RAMs).

Still referring to FIG. 4, the handshake logic includes data valid register 32 that is used by the DASM (discussed above) to indicate that valid data is ready in the DASM Data Reg. The Data Valid Reg is reset by NOR gate 34 once a frame has ended and DMSM has completed processing the word of the data that is in the DASM Data Reg. The output data valid signal is fed over the line labelled Data Valid through AND gate 38 to set the Copy Valid Register 36. The Copy Valid Register 36 is used to latch up the copy valid signal from the addressed match function (AMF) (FIG. 1). The contents of this register must be preserved until match processing completes. The Copy Valid Register cannot be corrupted by a new frame coming in if match processing is still active. It gets reset once no more data is valid from DASM and no match activity is going on. Thus, it is reset by the signal generated from combinatorial logic 30. The Pattern Done Register 40 is set by DMSM to indicate when pattern matching is complete. Finally, AND gate 42 generates the signal labeled NWUP_MATCH. As stated above, this signal indicates that a match is found and the system should be awakened.

Referring to FIG. 3 for the moment, an index count on a 5 bit bus that is labelled NEXT INDEX COUNT is outputted from the DMSM 20 to the INDEX COUNT REG and the value is returned back to the DMSM. The index count is incremented by 1 after each word of data from the DASM is checked. The index count ranges from 0 to 0×1 F. The index count is used to address both Mask RAM and the Pattern RAM. The address for the Mask RAM is simply the index count. The address for the Pattern RAM is generated by concatenating the lower three order bits of the current DMSM state with the index count.

Figure 5A:
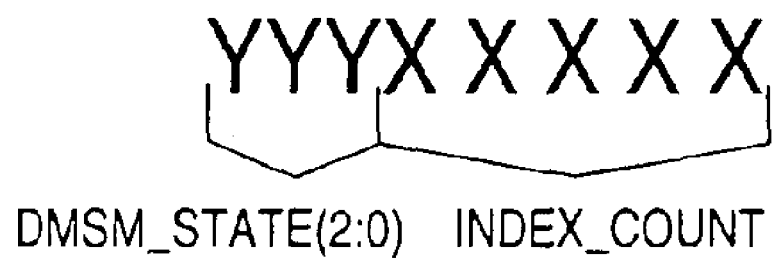
FIGS. 5A and 5B show graphical representations for a pattern read address.

Turning to FIG. 5A for the moment, a graphical representation of the Pattern Data Read Address Generation is shown. The symbol YYY represents the DMSM state and the symbol XXXXX represents index count.

Figure 5B:
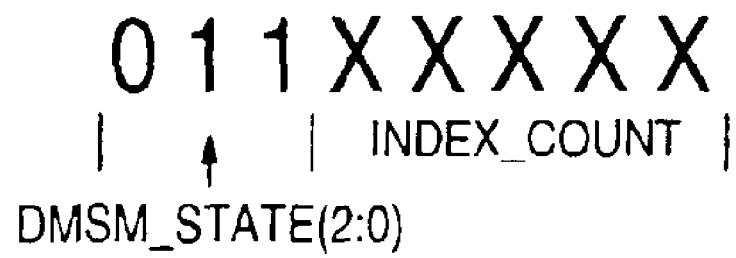

FIG. 5B shows a graphical representation of an example. For purpose of this example—let us assume the DMSM, while in state 3, a read must be done for the compare data for state 4. State (pattern) 4's data is in the RAM at offset 0×180-0×1FF by byte, an 0×060-07F by word. By concatenating a three (digital 011) with the index count, the address looks like the showing in FIG. 5B.

While the invention has been particularly shown and described with reference to a preferred embodiment, it will be understood by those skilled in the art that various changes in form and detail may be made therein without departing from the spirit and scope of the invention.

What is claimed is:

1. A network interface card including:
   a system interface circuit arrangement;
   a network interface circuit arrangement;
   a first storage that stores a set of patterns;
   a second storage that stores mask data identifying patterns in the first storage to be matched against data; and
   a pattern match logic circuit arrangement correlating marked patterns in said first storage with the data and generating at least one first control signal if a match occurs between one of the marked patterns and the data.

2. The network interface card of claim 1 wherein the data is received from the network.

3. The network interface card of claim 1 or 2 further including a host computer coupled to the system interface, said host computer including software for downloading to the network interface card the set of patterns and the mask data.

4. The network interface card of claim 1 or 2 further including address match function logic circuit for correlating an address for the network interface card and a received address and generating a second control signal on the occurrence of a match.

5. The network interface card of claim 1 or 2 wherein each pattern in the set of patterns are arranged in 4 (four) bytes wide words and 128 byte sectors.

6. The network interface card of claim 5 wherein the patterns are arranged continuously in the Pattern Storage.

7. The network interface card of claim 5 wherein the mask data is arranged so that each M-bits word of mask contains mask bits for words in N patterns, wherein M=number of bits in a mask word and N=number of patterns.

8. The network interface card of claim 7 wherein the M=32 and N=8.

9. The network interface card of claim 1 wherein the pattern match logic circuit arrangement includes a first state machine for assembling data received from the network interface circuit arrangement into predetermined sizes and identifying beginnings and endings of data framings; and
   a second state machine operatively coupled to the first state machine, said second state machine including circuit that receives the predetermined sizes from the first state machine and circuit that generates addresses for accessing the pattern storage and mask storage, whereat data are to be read and used with the predetermined sizes in generating the first control signal.

10. The network interface card of claim 9 wherein the address generation circuit uses the expression YYYxxxxx to determine the addresses for the Pattern RAM, wherein xxxxx represents an index count and YYY represents states for a state machine.

11. The network interface of claim 1 wherein the system interface circuit arrangement includes a PCI interface.

12. The network interface of claim 1 wherein the network interface circuit arrangement includes Ethernet MII Interface.

13. A method for using in a communications network to wake station connected to the communications network said method including the steps of:
   (a) providing, on a network interface card, multiple patterns against which data from the communications network is to be matched;
   (b) providing mask data indicating the patterns to be used;
   (c) correlating each identified pattern with data received from the communications network; and
   (d) generating a Wake-Up signal if a match occurs in step (c).

14. The method of claim 13 further including the steps of
   (e) a receiving station correlating a station address with an address received with the data from the communications network; and
   (f) generating the Wake-Up signal only if a match occurs step e and a match occurs step c.

15. A pattern matching method including the steps of:
   (a) providing a set of patterns;
   (b) providing data to be matched with selected patterns in said set of patterns;
   (c) providing pointers including mask bits.

16. The method of claim 15 wherein the set includes eight patterns.

17. The method of claim 16 wherein the mask bits includes 32 bits with groups of 4 mask bits identifying one of the eight patterns.

18. A device for matching patterns against data comprising:
   a first memory in which a set of patterns are stored;
   a second memory that stores mask data indentifying patterns in the first memory to be matched against the data; and
   pattern match logic circuit arrangement correlating marked patterns in said first memory against the data and generating at least one control signal if a match occurs wherein the pattern match logic circuit arrangement includes a first state machine for assembling data received from a network into predetermined sizes and identifying beginnings and endings of data frames; and
   a second state machine operatively coupled to the first state machine, said second state machine including circuit that receives the predetermined sizes from the first state machine and circuit that generates addresses for accessing the first memory and the second memory, whereat pattern and mask data are to be read and used with the predetermined sizes in generating the first control signal.

19. A device for matching patterns against data comprising:
   a first memory in which a set of patterns are stored;
   a second memory that stores mask data identifying patterns in the first memory to be matched against the data; and
   pattern match logic circuit arrangement correlating marked patterns which are fewer than the total number of patterns in said first memory, wherein the pattern match logic circuit arrangement includes a first state machine for assembling data received from a network into predetermined sizes and identifying beginnings and endings of data frames; and
   a second state machine operatively coupled to the first state machine, said second state machine including circuit that receives the predetermined sizes from the first state machine and circuit that generates addresses for accessing the first memory and the second memory, whereat pattern and mask data are to be read and used with the predetermined sizes in generating the first control signal.

* * * * *